US010647616B2

(12) United States Patent
Valverde et al.

(10) Patent No.: US 10,647,616 B2
(45) Date of Patent: May 12, 2020

(54) NON-INVASIVE REPAIR AND RETROFITTING OF HARDENED REINFORCED CONCRETE STRUCTURES (71) Applicant: SIKA TECHNOLOGY AG, Baar (CH)

(72) Inventors: Cristina Valverde, Madrid (ES); Luz Granizo Fernandez, Zürich (CH); Ramiro Garcia, Madrid (ES)

(73) Assignee: SIKA TECHNOLOGY AG, Baar (CH)

(*) Notice: Subject to any disclaimer, the term of this patent is extended or adjusted under 35 U.S.C. 154(b) by 0 days.

(21) Appl. No.: 15/549,789

(22) PCT Filed: Feb. 9, 2016

(86) PCT No.: PCT/EP2016/052700
§ 371 (c)(1),
(2) Date: Aug. 9, 2017

(87) PCT Pub. No.: WO2016/128385
PCT Pub. Date: Aug. 18, 2016

(65) Prior Publication Data
US 2018/0022656 A1  Jan. 25, 2018

(30) Foreign Application Priority Data
Feb. 9, 2015 (EP) ..................... 15154386

(51) Int. Cl.
C04B 41/48 (2006.01)
C04B 41/68 (2006.01)
C04B 41/00 (2006.01)
C04B 41/50 (2006.01)
C04B 28/02 (2006.01)
C04B 30/02 (2006.01)
B05D 5/00 (2006.01)
B05D 7/00 (2006.01)
C04B 41/63 (2006.01)
C04B 111/72 (2006.01)
C04B 111/00 (2006.01)

(52) U.S. Cl.
CPC .............. C04B 41/48 (2013.01); B05D 5/005 (2013.01); B05D 7/00 (2013.01); C04B 28/02 (2013.01); C04B 30/02 (2013.01); C04B 41/009 (2013.01); C04B 41/4857 (2013.01); C04B 41/50 (2013.01); C04B 41/5089 (2013.01); C04B 41/63 (2013.01); C04B 41/68 (2013.01); B05D 2203/30 (2013.01); B05D 2401/20 (2013.01); B05D 2504/00 (2013.01); C04B 2111/00663 (2013.01); C04B 2111/72 (2013.01); C04B 2111/723 (2013.01)

(58) Field of Classification Search
CPC ......... C04B 41/48; C04B 41/63; C04B 41/68; C04B 41/50; C04B 2111/72; C04B 41/009; C04B 28/02; C04B 30/02; C04B 41/5089; C04B 41/4857; B05D 5/005; B05D 7/00; B05D 2203/30; B05D 2401/20; B05D 2504/00
See application file for complete search history.

(56) References Cited

U.S. PATENT DOCUMENTS

| 2004/0077768 | A1 | 4/2004 | Greenwood | |
| 2010/0119851 | A1* | 5/2010 | Giessler-Blank | C04B 24/42 428/447 |
| 2010/0324173 | A1 | 12/2010 | Fischer et al. | |
| 2011/0203487 | A1* | 8/2011 | Aberle | C04B 20/1051 106/781 |
| 2012/0065301 | A1* | 3/2012 | Burge | C04B 28/02 524/5 |
| 2012/0309875 | A1* | 12/2012 | Aberle | C04B 28/021 524/272 |
| 2013/0281577 | A1* | 10/2013 | Chen | C04B 40/0039 524/5 |

FOREIGN PATENT DOCUMENTS

| DE | 102006049524 A1 * | 4/2008 | ........... C04B 14/062 |
| DE | 102006049524 A1 | 4/2008 | |
| DE | 102008061837 A1 * | 6/2010 | ........... B28B 7/0008 |
| DE | 102008061837 A1 | 6/2010 | |
| EP | 0729925 A1 * | 9/1996 | ............. C04B 28/10 |
| EP | 1 348 729 A1 | 10/2003 | |
| EP | 1138697 B1 | 11/2003 | |
| EP | 1 061 089 B1 | 3/2004 | |
| EP | 2251376 A1 * | 11/2010 | ............. C04B 28/02 |
| EP | 2251376 A1 | 11/2010 | |

(Continued)

OTHER PUBLICATIONS

Colloidal silica. https://en.wikipedia.org/wiki/Colloidal_silica (accessed Feb. 28, 2019). 2 pages. (Year: 2019).*
Precipitated silica. https://en.wikipedia.org/wiki/Precipitated_silica (accessed Feb. 28, 2019). 2 pages. (Year: 2019).*
What is silica. https://colloidalsilica.nouryon.com/colloidal-silica-facts-what-is-silica/ (accessed Feb. 28, 2019), 9 pages. (Year: 2019).*
Dauffer et al., "Repair and Strengthening of Damaged Reinforced Concrete Slabs with CFRP," 20th International Conference on Structural Mechanics in Reactor Technology (SMiRT 20), Espoo, Finland, Aug. 9-14, 2009, SMiRT 20-Division 8, Paper 2047, 8 pages. (Year: 2009).*
Santos, S.; Rodrigues, J.; Tonoli, G.; Almeida, A.; Savastano, H. Potential Use of Colloidal Silica in Cement Based Composites: Evaluation of the Mechanical Properties. Key Engineering Materials 2012, 517, 382-391. (Year: 2012).*

(Continued)

Primary Examiner — William P Fletcher, III
(74) Attorney, Agent, or Firm — Oliff PLC (57) ABSTRACT Described is an aqueous composition for repairing and/or sealing of hardened concrete structures, the aqueous composition including colloidal silica and polycarboxylate ether. Also described is a method for repairing and/or sealing a hardened concrete structure, including a step of applying an aqueous composition including colloidal silica and polycarboxylate ether to a hardened concrete structure or a part thereof.

11 Claims, 5 Drawing Sheets (56) References Cited

FOREIGN PATENT DOCUMENTS

JP       2014-177394 A     9/2014
JP        2014177394 A  *  9/2014

OTHER PUBLICATIONS

Wang, F.; Chen, P.; Li, X.; Zhu, B. Effect of Colloidal Silica on the Hydration Behavior of Calcium Aluminate Cement. Materials 2018, 11 (10), 1849. (Year: 2018).*
Hendrix, D.; Mckeon, J.; Wille, K. Behavior of Colloidal Nanosilica in an Ultrahigh Performance Concrete Environment Using Dynamic Light Scattering. Materials 2019, 12 (12), 1976. (Year: 2019).*
Apr. 21, 2016 International Search Report issued in Patent Application No. PCT/EP2016/052700.
Nov. 21, 2018 Office Action issued in Australian Patent Application No. 2016217974.
Mar. 28, 2019 Office Action issued in Australian Patent Application No. 2016217974.

* cited by examiner

NON-INVASIVE REPAIR AND RETROFITTING OF HARDENED REINFORCED CONCRETE STRUCTURES

TECHNICAL FIELD

The invention is directed to an aqueous composition for repairing and/or sealing of hardened concrete structures, a method for repairing and/or sealing of hardened concrete structures using the aqueous composition and the corresponding use of the aqueous composition.

BACKGROUND OF THE INVENTION

Modern concrete is a very durable construction material and, if properly proportioned and placed, will give very long service under normal conditions. Many concrete structures, however, were constructed using early concrete technology, and they have already provided well over 50 years of service under harsh conditions.

In any case, hardened concrete structures are subject to damages which may be a result of e.g. inappropriate manufacture or deterioration from weathering or other harsh conditions by mechanical, physical or chemical attack. Therefore, repair and/or sealing of concrete structures can be necessary to improve durability of the structures. Needs for repair and healing of concrete structures are becoming more important and in the future will be an important market, as long life cycles in construction have an increasing potential.

Apart from concrete repair materials based on mineral binder suitable for repair or restoration of damaged structures, there exist a range of other materials which are used for repairing and/or sealing of concrete structures.

For instance, pure colloidal silica can be used for repairing and sealing of hardened reinforced concrete structures. Effectiveness is, however, low.

Sika Ferrogard® products such as Sika Ferrogare-903+ from Sika Schweiz AG are used as a corrosion inhibiting product or invasive repair. These products penetrate into reinforced concrete and form a film around the reinforcement. A disadvantage of corrosion inhibiting products is the difficulty to assess effectiveness of the product. A disadvantage of invasive repair is generally high costs, and considerable time and resources are usually required. Access is sometimes difficult.

Examples for water resisting and crystalline waterproofing concrete admixtures are Sika WT-200® series, Sika Schweiz AG, which are crystalline admixtures for self-healing concrete resulting in crystalline-based self-healing, which react with portlandite (calcium hydroxide) to create water-insoluble crystals. Crystalline admixtures for waterproofing are also sold by Xypex Chemical Corp.

Other examples of agents which are used for repairing and/or sealing of concrete structures are *Bacillus sphaericus*, zinc sulfate, alumina-coated silica nanoparticles, blast furnace slag or fly ashes.

The materials used for repair and/or sealing are often rather expensive or exhibit low performance. Many approaches do not support self-healing processes. The application to the concrete material can be complicated and time consuming.

DE 102008061837 A1 relates to the preparation of a moulded article wherein an internal lining is formed of a grain mixture in which a binder is injected. A binder described is composed of cement, a micro-silica suspension, a nano-silica suspension, water and a plasticizer based on polycarboxylate ether.

US 2013/281577 A1 describes aqueous additive compositions for modifying cementitious compositions comprising colloidal nano-particles consisting of silica and polycarboxylate ether.

EP 2251376 A1 is concerned with aqueous polymer dispersions comprising, in a preferred embodiment, inter alia 5-15% by weight of a comb polymer, 10-30% by weight of fumed or colloidal silica and 30-70% by weight of water.

JP 2014-177394 A describes a repair method for concrete structures wherein a restoring material is applied to a place where a portion of concrete structure is removed, wherein the restoring material is a mortar composition comprising inter alia cement, fluidizing agent comprising polycarboxylic acid-based copolymer and amorphous silica fine powder.

DE 102006 049524 A1 relates to aqueous dispersions comprising precipitated silica or silicate and plasticizer such as polycarboxylate ether to increase early strength of cementitious preparations.

SUMMARY OF THE INVENTION

The object of the invention was to provide a composition for repairing and/or sealing of concrete structures, in particular reinforced concrete structures, which overcomes the disadvantages of the prior art approaches discussed above. In particular, the composition should be relatively inexpensive and enable simple and/or quick application to the concrete structure. Moreover, the composition should exhibit good performance by initiating healing processes of the cement.

Surprisingly, this object could be achieved by an aqueous composition including a combination of colloidal silica and polycarboxylate ether.

Accordingly, the present invention is related to an aqueous composition for repairing and/or sealing of hardened concrete structures, the aqueous composition comprising colloidal silica and polycarboxylate ether.

Major advantages of the composition are the low cost compared to other approaches, and the simplicity and/or rapidity of application. Surprisingly, an improved performance is also achieved as the growth of new hydrated cement products occurs, in particular at crack sides contributing to the crack "healing" process.

The aqueous composition enables a non-invasive treatment for hardened concrete structures that effectively interacts with existing concrete matrix forming new hydrated products in a secondary hydration process of cement and/or SCM. SCM is a common abbreviation for supplementary cementitious materials such as fly ash or slag, e.g. blast-furnace slag.

The invention is also related to a method for repairing and/or sealing of a hardened concrete structure, comprising the step of applying the aqueous composition according to the invention to the hardened concrete structure or a part thereof, and the use of the aqueous composition for repairing and/or sealing a hardened concrete structure. Preferred embodiments of the invention are recited in the dependent claims.

Details given in the following equally apply to the aqueous composition, the method and the use, where applicable.

DETAILED DESCRIPTION OF THE INVENTION

The aqueous composition comprises colloidal silica. Colloidal silica refers to silica particles dispersed in a colloidal state in a liquid phase, typically water. A colloid is a stable dispersion of particles. The stable dispersion or colloid of silica particles is also called silica sol. Colloidal silica is generally amorphous silica. Colloidal silica is commercially available from a number of companies. The commercial products of colloidal silica can vary e.g. with respect to the pH value, the particles size or the concentration. It is possible to use one type of colloidal silica or a mixture of two or more types of colloidal silica, differing e.g. in particle size.

The colloidal silica may be anionic colloidal silica or cationic colloidal silica. As is known by the skilled person, the dispersions of colloidal silica usually include cations or anions for stabilization. In the case of cationic colloidal silica the silica particles are usually coated with alumina. The colloidal silica may be non-surface modified silica or surface modified silica, for instance surface modified with silanes or siloxanes.

The weight average particle size of colloidal silica is usually in the range of 1 to 150 nm, preferably in the range of 2 nm to 35 nm, more preferably 5 nm to 10 nm. Particularly preferred is a small dispersion of particle size, e.g. a weight average particle size around 5 nm. The weight average particle size as used herein can be determined by dynamic light scattering method.

The aqueous composition further comprises polycarboxylate ether (PCE). The aqueous composition may comprise one or more polycarboxylate ethers.

The polycarboxylate ether is in particular a comb polymer having a polycarboxylate backbone or main chain and polyether side chains, wherein the polyether side chains are preferably linked to the polycarboxylate backbone via ester, ether and/or amide groups. Polycarboxylate ethers are commercially available.

The comb polymer preferably comprises the following partial structural units or consists thereof:

a) a partial structural unit S1 of formula (I) in a mole fraction of a

(I)

b) a partial structural unit S2 of formula (II) in a mole fraction of b

(II)

c) a partial structural unit S3 of formula (III) in a mole fraction of c (III)

d) a partial structural unit S4 of formula (IV) in a mole fraction of d (IV)

wherein
M independent from each other is H$^+$, an alkali metal ion, alkaline earth metal ion, a di- or trivalent metal ion, an ammonium ion or an organic ammonium group,
each R$^u$ independent from the others is hydrogen or a methyl group,
each R$^v$ independent from the others is hydrogen or COOM,
m=0, 1 or 2,
p=0 or 1,
R$^1$ and R$^2$ independent from each other are a C$_1$ to C$_{20}$-alkyl group, -cycloalkyl group, -alkylaryl group or -[AO]$_n$—R$^4$, wherein A=C$_2$ to C$_4$-alkylene, R$^4$ is H, a C$_1$ to C$_{20}$-alkyl group, -cyclohexyl group or -alkylaryl group, and n=2-250, wherein R$^1$ and/or R$^2$ or at least a part of R$^1$ and/or R$^2$ is preferably -[AO]$_n$—R$^4$,
R$^3$ independent from each other is NH$_2$, —NR$^5$R$^6$, —OR$^7$NR$^8$R$^9$,
wherein R$^5$ and R$^6$ independent from each other are a C$_1$ to C$_{20}$-alkyl group, -cycloalkyl group, -alkylaryl group or -aryl group; or a hydroxyalkyl group or a acetoxyethyl group (CH$_3$—CO—O—CH$_2$—CH$_2$—) or a hydroxy-isopropyl group (HO—CH(CH$_3$)—CH$_2$—) or an acetoxyisopropyl group (CH$_3$—CO—O—CH(CH$_3$)—CH$_2$—); or R$^5$ and R$^6$ together form a ring, the nitrogen being a part thereof, to form a morpholine or imidazoline ring;

$R^7$ is a $C_2$-$C_4$-alkylene group, $R^8$ and $R^9$ each are independent from each other a $C_1$ to $C_{20}$-alkyl group, -cycloalkyl group, -alkylaryl group, -aryl group or a hydroxyalkyl group, and wherein a, b, c and d represent mole fractions of the respective partial structural units S1, S2, S3 and S4, wherein a/b/c/d=(0.1-0.9)/(0.1-0.9)/(0-0.8)/(0-0.8), preferably a/b/c/d=(0.3-0.9)/(0.1-0.7)/(0-0.6)/(0-0.4), more preferably a/b/c/d=(0.5-0.8)/(0.2-0.4)/(0.001-0.005)/0, provided that a+b+c+d=1.

The sequence of the partial structural units S1, S2, S3 and S4 may be alternating, blockwise or random. In principle it is also possible that in addition to the partial structural units S1, S2, S3 and S4 further structural units are present.

The weight proportion of the partial structural units S1, S2, S3, and S4 together is preferably at least 50% by weight, more preferably at least 90% by weight and still more preferably at least 95% by weight with respect to the total weight of the comb polymer.

According to a further preferred embodiment the comb polymer is free of aromatic compounds and/or aromatic structural units.

The weight average molecular weight ($M_w$) of the comb polymer is preferably 5'000-150'000 g/mol, more preferably 10'000-100'000 g/mol. The weight average molecular weight can be determined by gel permeation chromatography (GPC).

Methods for preparing the comb polymers are known to the skilled person. The preparation may be e.g. carried out by radical polymerization of the corresponding monomers of formula ($I_m$), ($II_m$), ($III_m$) and/or ($IV_m$), respectively resulting in a comb polymer having the partial structural units S1, S2, S3 and S4, preferably in the mole fractions indicated above. The residues $R^u$, $R^v$, $R^1$, $R^2$, $R^3$, M, m and p are defined as described above.

($I_m$)

($II_m$)

($III_m$)

($IV_m$)

It is also possible to prepare the comb polymer by polymer-analogous reaction of a polycarboxylic acid or salt of formula (V), wherein $R^v$, $R^u$ and M are defined as described above and n represents the polymerization degree of the polymer.

(V)

In the polymer-analogous reaction a polycarboxylic acid or salt of formula (V) is esterified and/or amidated with the corresponding alcohols or amines (e.g. HO—$R^1$, $H_2$N—$R^2$, H—$R^3$) and then optionally neutralized or partially neutralized (depending on the type of residue M e.g. with metal hydroxides or ammonia). Details on the polymer-analogous reaction are disclosed e.g. in EP 1138697 B1 on page 7, line 20, to page 8, line 50, and in the examples thereof, or in EP 1061089 B1 on page 4, line 54, to page 5, line 38, and in the examples thereof. In a variant thereof, as described in EP 1348729 A1 on page 3 to page 5 and in the examples thereof, the comb polymer can be prepared in the solid state of matter. The disclosures of the patent publications mentioned are herewith enclosed by reference. The preparation by polymer-analogous reaction is preferred.

Such polycarboxylate ether comb polymers are also distributed commercially by Sika Schweiz AG under the trade name series ViscoCrete®.

Particularly suitable are comb polymers where for the partial structural units S1, S2, S3 and S4 described above a) the residue $R^v$ is hydrogen, b) the residue $R^u$ is a methyl group or a mixture of a methyl group and hydrogen. In the latter case the molar ratio of the methyl group to hydrogen is preferably 25:75-75:25, more preferably 40:60-60:40.

c) m=0, d) p=1, e) $R^1$, each independent from each other, is -[AO]$_n$—$R^4$ where n=20-70 and A=$C_2$-alkylene, f) $R^2$, each independent from each other, is -[AO]$_n$—$R^4$, where A is preferably a mixture of $C_2$— and $C_3$-alkylene, $R_4$ is preferably a methyl group and in particular n=20-70. The weight average molecular weight of the group -[AO]$_n$—$R^4$ is preferably 1'000-3'000 g/mol. The molar ratio of the $C_2$-alkylene units to the $C_3$-alkylene units is preferably 25:75-75:25, in particular 40:60-60:40.

g) $R^4$ is a methyl group and/or h) a/b/c/d=(0.5-0.8)/(0.2-0.4)/(0.001-0.005)/0

The aqueous composition contains water. As mentioned above a plurality of aqueous dispersions of colloidal silica or silica sol, respectively, as well as polycarboxylate ethers are commercially available. Also the polycarboxylate ether products commercially available can be mixtures with water.

The aqueous composition can be easily produced by mixing an aqueous dispersion of colloidal silica or silica sol, respectively, and polycarboxylate ether, e.g. as an aqueous solution or dispersion. If necessary, the water content may be adjusted by addition of further water. If necessary, the pH value may be adjusted by addition of an acid or a base.

The aqueous composition is a liquid. The aqueous composition is preferably an aqueous dispersion or sol. The pH value of the aqueous composition may vary in broad ranges depending on the type of components used and the desired application.

The content of colloidal silica in the aqueous composition, based on the total weight of the aqueous composition, is preferably 1 to 50% by weight, more preferably 5 to 50% by weight or 10 to 50% by weight and still more preferably 5 to 45% by weight or 10 to 45% by weight. As usual, the weight of colloidal silica here refers to the solid content of $SiO_2$, i.e. without water.

The content of polycarboxylate ether in the aqueous composition, based on the total weight of the aqueous composition, is preferably 1 to 50% by weight, more preferably 2 to 50% by weight or 4 to 50% by weight and still more preferably 2 to 25% by weight or 4 to 25% by weight.

In a preferred embodiment the content of colloidal silica in the aqueous composition, based on the total weight of the aqueous composition, is 10 to 20% by weight, and/or content of polycarboxylate ether in the aqueous composition, based on the total weight of the aqueous composition, is 2 to 10% by weight, in particular 2 to 5% by weight.

The content of water in the aqueous composition, based on the total weight of the aqueous composition, is e.g. at least 15% by weight, preferably at least 25% by weight, and more preferably at least 35% by weight.

The aqueous composition may optionally further comprise one or more additives. The additives may be those which are commonly used in this technical field.

In particular, it is generally appropriate that the aqueous composition does not contain a mineral binder such as e.g. cement, because a mineral binder is reactive with water.

The total amount of colloidal silica, polycarboxylate ether and water, based on the total weight of the aqueous composition, may vary depending on the requirements, e.g. at least 80% by weight, preferably at least 90% by weight, more preferably at least 95% by weight.

The aqueous composition according to the invention is suitable for a method for repairing and/or sealing a hardened concrete structure. The hardened concrete structure is preferably a hardened reinforced concrete structure.

The hardened concrete structure or hardened reinforced concrete structure may be e.g. any civil structure or a part thereof. Examples of civil structures are buildings, bridges, pipelines, dams, reservoirs, underground structures such as tunnels, stock underpasses and monuments. The hardened concrete structure or hardened reinforced concrete structure may be e.g. a wall, slab, beam, column, pier, post, handrail, parapet, foundation, flooring, frame, curb, sill, ledge, coping, cornice, or corner.

The degree of impermeability of concrete against water is determined by impermeability of the binder matrix. Hardened concrete is a porous material that allows the passage of water or other media through a structure of capillary pores. These capillaries are the voids created by the excess water in the concrete that is not necessary for the chemical reaction for hardening known as hydration.

In addition, the hardened concrete structure may have damages or defects e.g. caused by mechanical, chemical and/or physical attack. Common damages or defects in the concrete structure are e.g. cracks, voids or interstices. Of course, impermeability is further reduced by such damages or defects.

The method comprises the step of applying the aqueous composition of the invention to the hardened concrete structure or a part thereof. Depending on the purpose, the aqueous composition may be applied to the entire hardened concrete structure or only to a part thereof. For instance, the treatment may be effected only on parts of the hardened concrete structure, which include damages or defects or which may be exposed to harsher conditions, e.g. contact with water, than other parts.

The application of the aqueous composition to the hardened concrete structure or a part thereof may be carried out by conventional means. The aqueous composition may applied e.g. onto the surface of the concrete structure or a part thereof, e.g. by spray, roller or brush, so that the material can infiltrate into the surface. Transportation is mainly by capillary suction. This can be also considered as infiltration or impregnation.

Alternatively, the aqueous composition may be applied to the hardened concrete structure or a part thereof by injection. Common injection devices such as manual injection devices or injection pumps may be used. Injection is particularly suitable for filling of cracks but this can also be achieved by the other methods mentioned.

Alternatively, the aqueous composition may be applied to the hardened concrete structure or a part thereof by migrating. The migrating method is a method known by the skilled person wherein an anolyte is positioned on one side of the hardened concrete structure to be repaired or sealed and a catholyte is positioned on the other side. An external electrical potential is then applied across the hardened concrete structure so that ions can migrate into the structure. In the migrating method according to the invention the aqueous composition of the invention is used as one electrolyte, preferably as the catholyte. The other electrolyte, preferably the anolyte, is e.g. water, in particular distilled water. The migration can be effected in one or more cycles of application of the external electrical potential.

Figure 1:
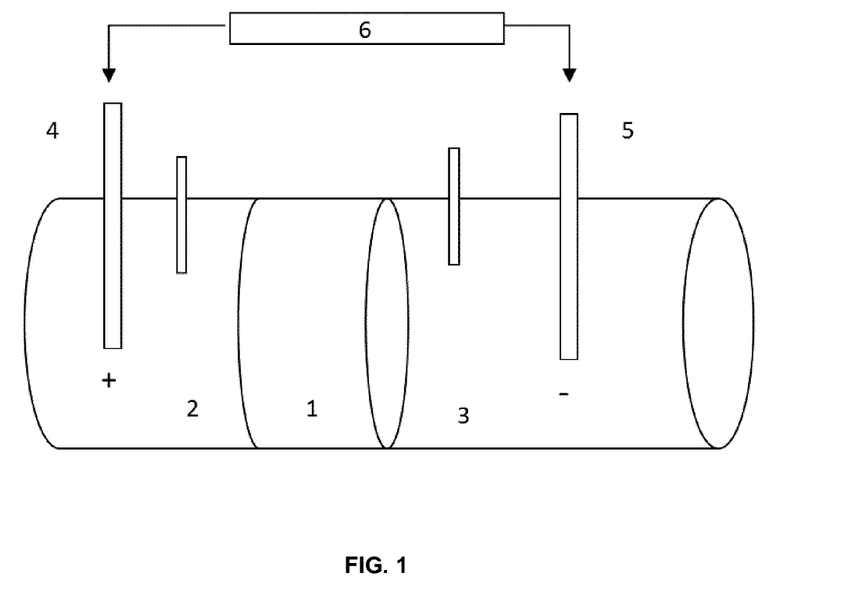
FIG. 1 is a schematic view of the migrating method according to the invention.

FIG. 1 is a schematic view of the migrating method according to the invention. In FIG. 1 the aqueous composition of the invention is positioned as the catholyte 3 on one side of the hardened concrete structure 1 to be repaired or sealed. Water, in particular distilled water, is positioned on the other side as the anolyte 2. Electrodes 4, 5 are immersed in the anolyte and catholyte, respectively, which are connected to a voltage source 6 (e.g. 12 V). The electrical potential can be applied e.g. in 3 cycles, namely 2 days connected and 1 day disconnected.

Accordingly, the aqueous composition is preferably applied to the hardened concrete structure or a part thereof by injecting, migrating or capillary suction. Injecting and capillary suction are very simple application methods. The migrating method is rapid and time saving. The aqueous composition may be applied by a combined treatment of infiltration (capillary suction) and migration (electrical field).

The method of the invention is a non-invasive method. Non-invasive means a non-destructive method, i.e. the concrete to be repaired and/or sealed, such as fissured concrete, is not removed.

The method of the invention is particularly suitable for hardened concrete structure or hardened reinforced concrete structure which includes cracks.

Sealing of the concrete structure refers to protection against ingress, i.e. reducing or preventing the ingress of adverse agents, e.g. water, other liquids, vapour, gas, chemicals and biological agents. Sealing is a measure to improve impermeability of the concrete.

The components of the aqueous composition according to the invention can form non-soluble materials throughout the pore and capillary structure of the concrete and seal the concrete. Thus, the protection against penetration of water and other liquids can be improved so that impermeability is enhanced.

In addition, the aqueous composition can also repair damages or defects of the hardened concrete structure by enhancing the self-healing properties of concrete and improving the ability to heal damages or defects such as concrete cracks.

The components of the aqueous composition, in particular colloidal silica, effectively interacts with the existing concrete matrix of the concrete structure forming new hydrated cement products in a secondary hydration process of cement and/or SCM. The growth of new hydrated cement products occurs in particular at crack sides also involved in the crack healing process. Thus, a restoration of concrete can take place.

The aqueous composition of the invention comprising colloidal silica and PCE has significantly improved performance compared to the use of colloidal silica by itself. Thus, by the method of the invention the aqueous composition applied enables forming new hydrated products at the crack sides with Ca/Si ratio below 1.0 in some cases, what demonstrates the effectiveness of the method. While ordinary values for Portland CSH phase are Ca/Si=1.6-1.8 in a SEM characterization, the new chemical and physical healing is based on a different phase (not Portlandite) with a Ca/Si ratio of 0.8-1.

The method of the invention is suitable for sealing of hardened concrete structures. The impermeability of the concrete structure can be improved by this treatment. Thus, the method of the invention is suitable for retrofitting the concrete structure. The method of the invention is also suitable for repairing of hardened concrete structures, since it induces growth of new hydrated cement product, in particular at crack sides, so that a healing or restoration can be achieved. Of course, the method is also suitable for repairing and sealing of hardened concrete structures simultaneously.

The method of the invention may optionally be combined with at least one additional treatment of the concrete structure. The additional treatment may be selected from at least one of the conventional treatments of hardened concrete structures, e.g. protecting the reinforcement of reinforced concrete by application of a corrosion inhibiting agent, crack sealing with a reactive agent, e.g. epoxy resin or polyurethane resin, or waterproofing of the surface of the concrete structure with a hydrophobic material (hydrophobic impregnation).

Accordingly, the aqueous composition of the invention is suitable for repairing and/or sealing a hardened concrete structure, preferably a hardened reinforced concrete structure.

EXAMPLES

Example 1 and Reference Examples 1 and 2

In order to repair cracks in a hardened concrete structure, three aqueous compositions as shown in the following table were tested. Each of the aqueous compositions was applied by brush on the concrete structure having cracks (capillary suction).

| | |
|---|---|
| Ref. 1 | Aqueous solution of colloidal silica, surface treated with epoxysilane, $SiO_2$ content: 37% by weight, average particle size 12 nm |
| Ref. 2 | Aqueous solution of colloidal silica, surface treated with organopolysiloxane, $SiO_2$ content: 29% by weight, average particle size 7 nm |
| Ex. 1 | Aqueous composition containing colloidal silica and polycarboxylate ether (Viscocrete ®, Sika Schweiz AG), $SiO_2$ content: 13% by weight (10-20% by weight), average particle size silica: 5-10 nm, polycarboxylate ether content 4% by weight (2-5% by weight) |

Ex. 1 is the inventive aqueous composition. Ref. 1 and Ref. 2 are reference examples. It is possible to see the filling of cracks ("healing" process) of the treated concrete structure under simply visual observation with a stereoscopic magnifying glass. This relies on the growth of new hydrated cement phases.

The depth of penetration was determined for Ref. 2 and Ex. 1 as shown in the following table:

| | Depth of penetration |
|---|---|
| Ref. 2 | 1 mm |
| Ex. 1 | 2.5 mm |

Figure 2A:
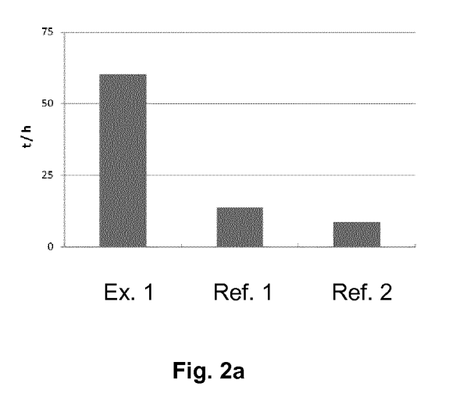
FIGS. 2a/2b, 3a/3b, 4a/4b and 5a/5b show results obtained in the Examples and Reference Examples.

Further tests are carried out for the treated concrete structure. The time in hours ("t/h") used in Examples Ref. 1, Ref. 2 and Ex. 1 is shown in FIG. 2a. The time in hours refers to the time needed for diffusion of chloride (standard UNE 83987:2009 for concrete durability) which is based on ASTM C 1202-97, standard test method for electrical indication of concrete's ability to resist chloride ion penetration.

Figure 2B:
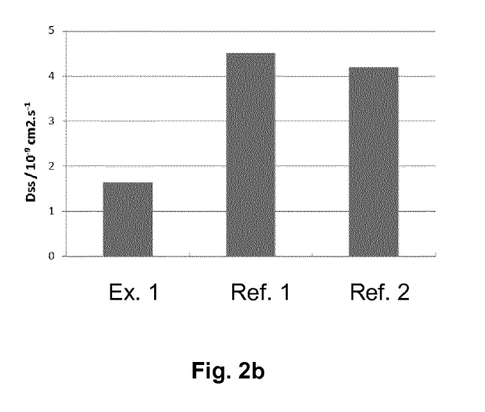

The coefficient of diffusion of chlorides ("Dss") in hardened concrete following the standard UNE 83987:2009 (Durabilidad del hormigón. Métodos de ensayo. Determinación de los coeficientes de difusión de los iones cloruro en el hormigón endurecido; Concrete durability. Test methods. Determination of coefficients of diffusion of chloride ions in hardened concrete) for Examples Ref. 1, Ref. 2 and Ex. 1 is shown in FIG. 2b.

As can be seen, for the inventive Example Ex. 1 diffusion coefficient of chloride is lower and time needed for diffusion of chloride is increased, so durability of concrete is improved.

Figure 3:
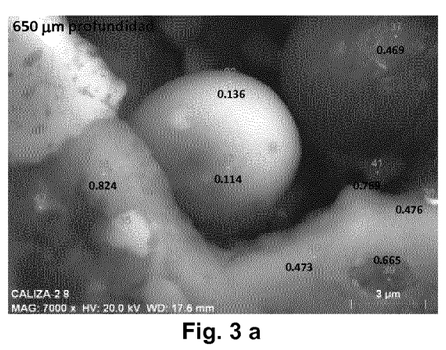
Figure 4:
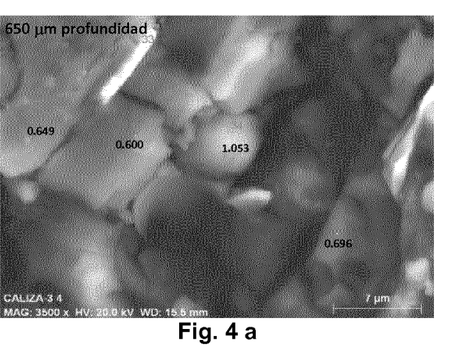

FIGS. 3a and 3b are photographs with different magnification of a healed crack treated with Ref. 2. FIGS. 4a and 4b are photographs with different magnification of a healed crack treated with Ex. 1.

Example 2

A crack of a hardened concrete structure was treated with the aqueous composition of Ex. 1 as defined above, wherein Ex. 1 is applied by the migrating method as described in the description and schematically shown in FIG. 1. An electrical potential of 12 V was applied on 2 days. For one day between these two days, the electrical potential was not applied.

After the treatment, the crack was healed. It is possible to see the filling of cracks ("healing" process) of the treated concrete structure under simply visual observation with a stereoscopic magnifying glass. This relies on the growth of new hydrated cement phases.

Example 3

Figure 6:
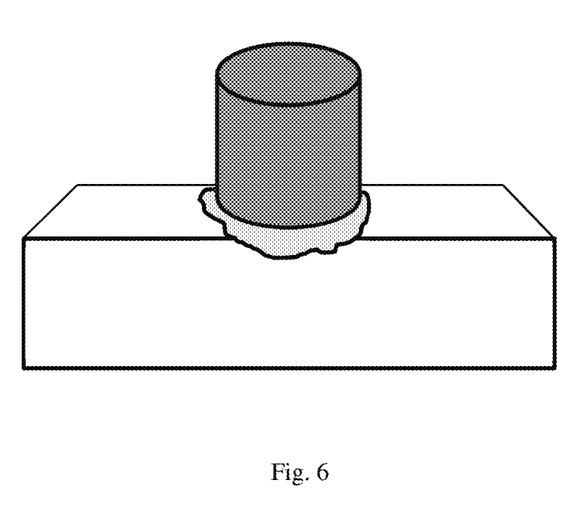
FIG. 6 shows the configuration of an infiltration method used in the Examples.

A crack in a hardened concrete structure (crack size about 83 μm) was treated with the aqueous composition of Ex. 1 as defined above, wherein Ex. 1 is applied by infiltration. The aqueous composition was applied on the surface of the concrete structure with the crack with a small container sealed over the crack to ensure a quantity of the composition over the crack. The treatment was carried out for 7 days. FIG. 6 shows the configuration of the treatment.

Figure 5:
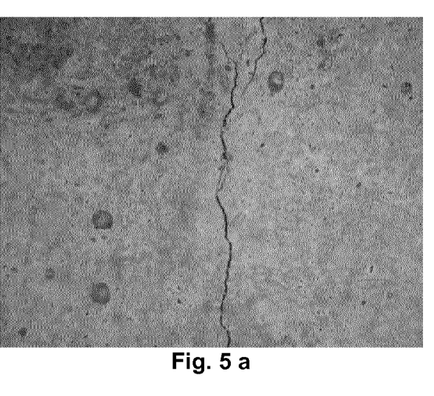

FIG. 5a shows the crack in the concrete structure before the treatment and FIG. 5b shows the healed crack after the treatment for 7 days.

Example 4

Fissure filling was tested with the aqueous composition of Ex. 1 as defined above. Tests in fissured mortar, after 28 days curing and combined treatment of infiltration (capillary suction) and migration (electrical field) with the aqueous composition of Ex. 1. The results are shown in FIG. 7a-d.

Figure 7A:
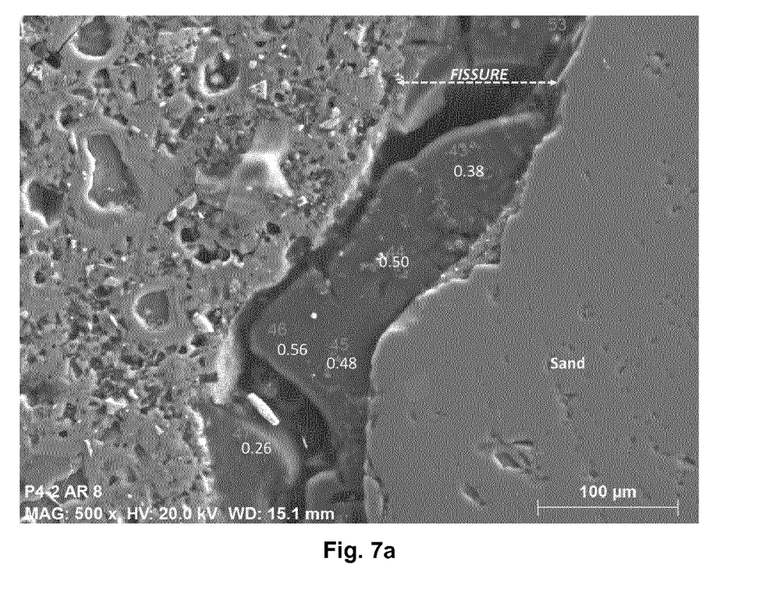
FIGS. 7a, 7b, 7c and 7d show results obtained in the Examples.

FIG. 7a shows an electron microscopy image of the fissure at 200 microns depth with respect to the surface treated (post-treatment after 28 days). FIG. 7a demonstrates that the fissure is completely sealed.

Figure 7B:
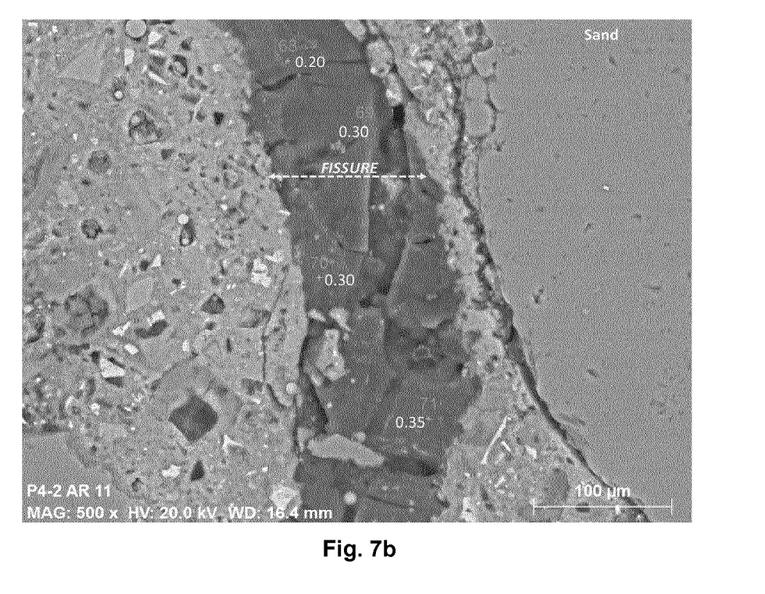

FIG. 7b shows an electron microscopy image of the fissure at 1 mm depth with respect to the surface treated (post-treatment after 28 days). The image of electron microscopy according to FIG. 7b confirms that the treatment is able to seal the fissure.

Figure 7C:
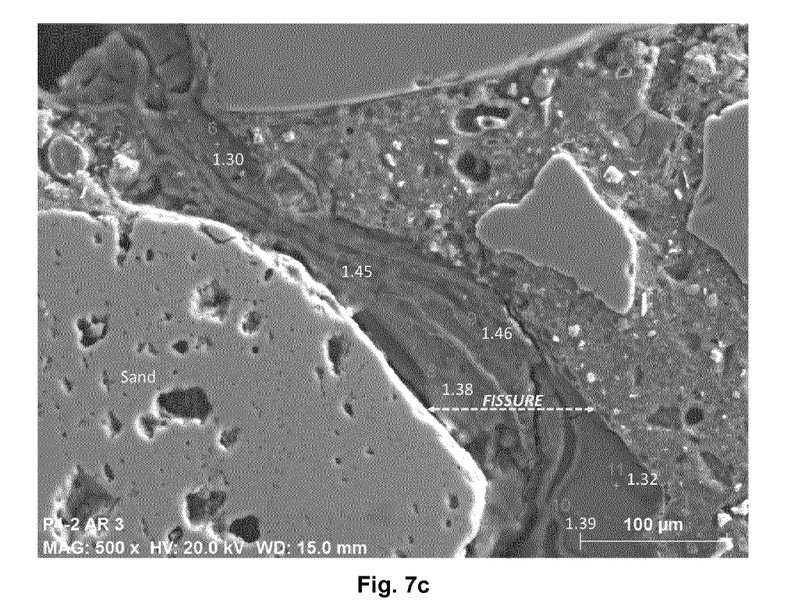

FIG. 7c shows an electron microscopy image of the fissure at 3 mm depth with respect to the surface treated (post-treatment after 28 days). From FIG. 7c it can be inferred that the new silica gel formed with the treatment is completely filling the fissure.

Figure 7D:
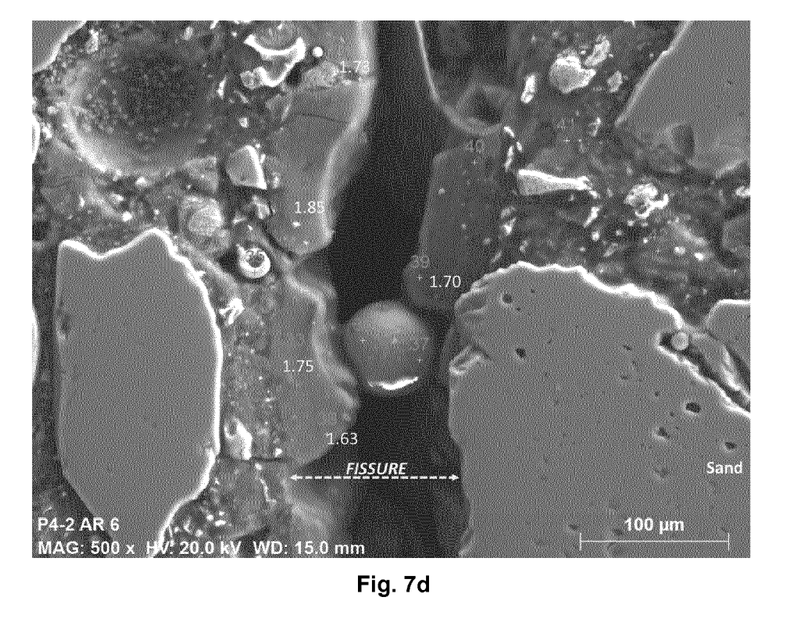

FIG. 7d shows an electron microscopy image of the fissure at 1 cm depth with respect to the surface treated (post-treatment after 28 days). FIG. 7d shows presence of silica gel that partially fills the fissure in 1 cm depth.

REFERENCE LIST 1 hardened concrete structure
2 anolyte, e.g. distilled water
3 catholyte, aqueous composition of the invention
4, 5 electrodes
6 voltage source

The invention claimed is:

1. A non-invasive method for repairing a hardened concrete structure, comprising:
    applying an aqueous composition to the hardened concrete structure or a part thereof, the aqueous composition comprising colloidal silica and polycarboxylate ether,
        wherein, based on a total weight of the aqueous composition, a content of the colloidal silica is in a range of 5 to 50% by weight and a content of the polycarboxylate ether is in a range of 2 to 50% by weight,
        wherein a total amount of colloidal silica, polycarboxylate ether and water, based on the total weight of the aqueous composition, is at least 80% by weight,
        wherein the aqueous composition does not contain cement, and
        wherein the application of the aqueous composition to the hardened concrete structure is non-invasive.

2. The method according to claim 1, wherein the weight average particle size of the colloidal silica is in the range of 1 nm to 150 nm.

3. The method according to claim 1, wherein the weight average particle size of the colloidal silica is in the range of 5 nm to 10 nm.

4. The method according to claim 1, wherein, based on the total weight of the aqueous composition the content of polycarboxylate ether is in the range of 2 to 25% by weight.

5. The method according to claim 1, wherein the polycarboxylate ether is a comb polymer.

6. The method according to claim 1, wherein the total amount of colloidal silica, polycarboxylate ether and water, based on the total weight of the aqueous composition, is at least 90% by weight.

7. The method according to claim 1, wherein, based on the total weight of the aqueous composition, the content of water is at least 15% by weight.

8. The method according to claim 1, wherein the hardened concrete structure is a hardened reinforced concrete structure.

9. The method according to claim 1, wherein the aqueous composition is applied by injecting, migrating, infiltration or application onto the surface of the structure.

10. The method according to claim 1, wherein the hardened concrete structure includes cracks.

11. The method according to claim 1, wherein the method comprises at least one additional treatment of the concrete structure selected from protecting the reinforcement by application of a corrosion inhibiting agent, crack sealing with a reactive agent or waterproofing of the surface of the concrete structure with a hydrophobic material.

* * * * *